United States Patent
Harpole

(10) Patent No.: US 10,809,014 B1
(45) Date of Patent: Oct. 20, 2020

(54) THERMAL STORAGE WITH BLADDER TANK

(71) Applicant: NORTHROP GRUMMAN SYSTEMS CORPORATION, Falls Church, VA (US)

(72) Inventor: George M. Harpole, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 168 days.

(21) Appl. No.: 15/942,072

(22) Filed: Mar. 30, 2018

(51) Int. Cl.
*F28D 20/00* (2006.01)
*H01S 3/04* (2006.01)

(52) U.S. Cl.
CPC ........ *F28D 20/0039* (2013.01); *H01S 3/0407* (2013.01); *F28D 2020/0069* (2013.01); *F28D 2020/0086* (2013.01)

(58) Field of Classification Search
CPC ............. F28D 20/0039; F28D 20/0034; F28D 2020/0065; F28D 2020/0086; F28D 2020/0091; F28D 2020/0095; F28D 2020/006; F28D 2020/0069; F28D 2020/0073; F24D 3/1016; H01S 3/04; H01S 3/0405; H01S 3/0407; H01S 3/042;
(Continued)

(56) References Cited

U.S. PATENT DOCUMENTS 3,400,249 A * 9/1968 Mekjean ................. F24D 11/00
126/400
4,129,177 A * 12/1978 Adcock ................. F24F 5/0046
165/48.2
(Continued)

FOREIGN PATENT DOCUMENTS

DE 102013021285 A1 * 6/2015 ............. F25B 30/04
EP 0769619 A1 * 4/1997 ............. F01P 11/20

OTHER PUBLICATIONS

Atkins, T., & Escudier, M. (2013). orifice. In (Ed.), A Dictionary of Mechanical Engineering. : Oxford University Press,. Retrieved Feb. 19, 2019, from http://www.oxfordreference.com/view/10.1093/acref/9780199587438.001.0001/acref-9780199587438-e-4297. (Year: 2013).*

(Continued)

*Primary Examiner* — Jianying C Atkisson
*Assistant Examiner* — Miguel A Diaz
(74) *Attorney, Agent, or Firm* — John A. Miller; Shumaker, Loop Kendrick, LLP

(57) ABSTRACT

A cooling system for a heat source, such as a laser system, that includes a mixing valve mixing a cooling fluid from a hot line and a cold line and providing the mixed cooling fluid to the heat source, and a bladder tank having a bladder and including a hot side on one side of the bladder in fluid communication with the hot line and a cold side on an opposite side of the bladder in fluid communication with the cold line. A heat exchanger cools the cooling fluid flowing through the cold line. The cooling system is configured so that when the heat source is on and generating heat, cold (Continued)

cooling fluid from the cold side of the bladder tank is provided to the mixing valve and when the heat source is off and not generating heat, cold cooling fluid from the cold line fills the cold side of the bladder tank.

16 Claims, 1 Drawing Sheet

(58) Field of Classification Search
CPC .. H01S 5/024; H01S 5/02407; H01S 5/02423; F25B 2400/04; F25B 2400/0411; F25B 43/006
See application file for complete search history.

(56) References Cited

U.S. PATENT DOCUMENTS

| | | | | |
|---|---|---|---|---|
| 4,135,571 | A * | 1/1979 | Tamblyn | F24D 11/002 165/104.31 |
| 4,193,442 | A * | 3/1980 | Vian | B01D 35/18 165/300 |
| 4,479,352 | A * | 10/1984 | Yamaoka | F01K 3/00 60/652 |
| 4,501,262 | A * | 2/1985 | Lyon | F24D 17/0021 126/640 |
| 4,523,629 | A * | 6/1985 | Copeland | F24D 11/002 126/640 |
| 6,907,923 | B2 * | 6/2005 | Sienel | F24D 17/02 122/437 |
| 7,502,396 | B2 * | 3/2009 | Kawashima | H01S 3/042 372/34 |
| 7,584,628 | B2 | 9/2009 | Harpole | |
| 7,997,079 | B2 * | 8/2011 | Seidel | F28D 20/0039 60/645 |
| 2004/0134647 | A1 * | 7/2004 | Sienel | F24D 17/02 165/236 |
| 2005/0218240 | A1 * | 10/2005 | Sienel | F24D 17/02 237/2 B |
| 2007/0104233 | A1 * | 5/2007 | Vetrovec | H01S 3/042 372/35 |
| 2007/0297470 | A1 * | 12/2007 | Kawashima | H01S 3/042 372/35 |
| 2008/0000613 | A1 * | 1/2008 | Harpole | F28D 20/0039 165/10 |
| 2012/0067300 | A1 * | 3/2012 | Berrio | F24D 11/004 122/14.3 |
| 2014/0260376 | A1 * | 9/2014 | Kopko | F25D 3/005 62/99 |
| 2015/0345802 | A1 * | 12/2015 | Van Haaren | F24D 3/1008 220/721 |
| 2016/0076821 | A1 * | 3/2016 | Kopko | F25B 7/00 165/10 |
| 2017/0294755 | A1 * | 10/2017 | Takigawa | B23K 26/703 |
| 2018/0026416 | A1 * | 1/2018 | Kasahara | H01S 3/042 372/35 |
| 2018/0347874 | A1 * | 12/2018 | Kopko | F25B 7/00 |

OTHER PUBLICATIONS

Atkins, T., & Escudier, M. (2013). heat exchanger. In a Dictionary of Mechanical Engineering. : Oxford University Press. Retrieved Aug. 20, 2019, from https://www.oxfordreference.com/view/10.1093/acref/9780199587438.001.0001/acref-9780199587438-e-2773. (Year: 2013).*

* cited by examiner

THERMAL STORAGE WITH BLADDER TANK

BACKGROUND

Field

This disclosure relates generally to a thermal cooling system for cooling a heat source and, more particularly, to a thermal cooling system for cooling an intermittent laser, where the system includes a bladder tank coupled between a hot line and a cold line that operates to collect cold cooling fluid when the laser is off and provide the stored cold cooling fluid to the laser when it is on.

Discussion

High power laser systems have many applications, including industrial, commercial, military, etc. For example, high power laser systems can be employed in defensive laser weapons systems that operate to shoot down incoming missiles, where the laser system can be configured on aircraft or ships that are constantly in motion. One known type of laser system for this purpose is a fiber laser amplifier system that employs a doped fiber that receives a seed beam and a pump beam that amplifies the seed beam and generates a high power laser beam, where the fiber has an active core diameter of about 10-20 µm or larger. High power fiber laser amplifier systems generate a lot of heat that needs to be removed in order to allow the laser system to operate efficiently. More particularly, fiber laser amplifier systems often employ diode pump lasers that provide the pump beams that amplify the seed beam, where the wavelength of the pump beams needs to be accurately controlled so that it is in the narrow absorption band of the fiber. If the diode pump lasers change in temperature the wavelength of the pump beam shifts, which can cause the laser beam power to decrease.

In order to control the temperature, high power laser amplifier systems include a thermal cooling system that typically employs a cooling fluid flow, such as water or ethylene glycol water (EGW), that draws heat away from the laser system, where it is subsequently cooled in a heat exchanger that receives a refrigeration flow from a refrigeration system before it is returned to the laser system. The necessary precise temperature control is typically provided in these thermal cooling systems by a thermal control mixing valve that mixes chilled cooling fluid from the heat exchanger with warm cooling fluid that by-passes the heat exchanger. These mixing valves typically come in two types, specifically mixing valves having bimetallic strips or electronically controlled mixing valves that employ a sensor in the mixed fluid at the valve exit. In order to allow the laser system to be operational or ready at any point in time, the cooling fluid is generally pumped through the laser system during all times, even when the laser system is not operating.

High power laser weapons systems operate intermittently. For example, the laser system may be on for half a minute or less, dissipating many tens of kilowatts of heat, then off for a half an hour or longer. Because it is necessary to remove a significant amount of heat while the laser system is on, such as 25 kilowatts, the size of the heat exchanger and refrigeration system would normally need to be significantly large, which reduces its ability to be configured in a small space, such as on an aircraft, and be lightweight. However, since operation of the laser system is intermittent, it is possible to reduce the size of the heat exchanger and refrigeration system by employing a proper thermal storage system.

Many different types of thermal storage systems are known in the art for this purpose. For example, one approach includes a liquid-solid phase change heat exchanger that employs phase change materials (PCMs). A PCM heat exchanger can be made similar to a plate-fin heat exchanger, but with parting sheets between fluids replaced by a layer of PCM sandwiched between two pieces of sheet metal. The PCM needs to be vacuum filled into a conductive filler, such as a graphite foam, but the conductive filler needs to be thermally connected to the sheet metal, such as by metalizing the graphite foam and soldering it into the overall sandwiched structure. However, drawbacks of such PCM heat exchangers include complexity, development time and cost, fabrication cost, flammable and volatile PCM, leaks, etc. To minimize the chances of leaks, reduce risks, and assure structural integrity, the metal thickness in PCM heat exchangers can be increased. However, metal may dominate as a weight contributor so that the PCM component may be heavier than simpler fluid thermal storage systems. An alternative to a PCM heat exchanger is an ordinary heat exchanger with a one fluid PCM heat sink downstream on the laser fluid flow loop. This reduces the complexity, but the other drawbacks are the same, and the extra casing increases the weight.

Liquid-gas phase change systems can be a viable cooling approach if the vapor is exhausted overboard, where the fluid is an expendable refrigerant. For example, ammonia stored in tanks as a room temperature liquid can be employed in heat exchangers on airborne lasers to remove large amounts of heat in real time, where the ammonia vapor is exhausted overboard. However, these systems include various drawbacks, such as supplying ammonia, carrying a toxic and volatile fluid, concerns over the corrosive and toxic exhaust, etc. Contrary, advantages include lightweight and relatively simple system, eliminating refrigeration and mixing valves, and the ability to dial in the boiling temperature with a back pressure valve on the exhaust line.

One known type of thermal storage system employs a cooling fluid storage tank that stores a low temperature cooling fluid when the laser system is off that is available for use during those times when the laser system is operating. The heat exchanger would cool the cooling fluid when the laser system is off and not generating heat to a much lower temperature than what it could do when the laser system is on, and that cold cooling fluid is stored in the storage tank. Water and EGW have very large specific heat capacities, and thus if these fluids are stored in the tank at a much colder temperature than what they will be heated to by the laser system, then the thermal storage capacity is can be significantly high. In this case, the refrigeration system and heat exchanger could be of a size that is one or two orders of magnitude smaller than what is needed to remove the high levels of heat continuously. The storage tank for this purpose can be very lightweight plastic, composite or thin stainless steel with a composite overlap.

U.S. Pat. No. 7,584,628 issued Sep. 8, 2009 to Harpole, discloses a cooling system for a laser system that employs an in-line thermal storage tank that receives the cooling fluid from a heat exchanger and stores it therein, where the output of the storage tank is provided to a thermal control mixing valve. When the laser system is off and the cooling fluid is able to be provided to the heat exchanger at a reduced temperature, cold cooling fluid from the heat exchanger can be stored in the thermal storage tank so that when the laser system is operational, that cold cooling fluid is available to be mixed with the heated cooling fluid from the laser system to better cool the laser system while it is on. The thermal storage tank has features that cause a piston-like flow where reduced temperature, but still hot cooling fluid from the reduced size heat exchanger enters the storage tank and operates to push out lower temperature cooling fluid to the mixing valve previously stored in the tank when the laser system was off. However, such thermal storage tanks are typically gravity dependent based on their orientation to provide this type of cooling fluid flow, which may not always operate properly on an aircraft having accelerations in different directions. Further, when the laser system is being turned on and off and waste heat is being generated intermittently, layers of hot and cold cooling fluid are stored in the thermal storage tank, which may cause undesirable timing where a hot layer of cooling fluid may exit the storage tank when the laser system is on.

SUMMARY

The following discussion of the present disclosure describes a thermal cooling system for a heat source, such as a laser system. The cooling system includes a coolant loop providing a flow of cooling fluid to the heat source, where the coolant loop includes a cold flow line and a hot flow line. The cooling system also includes a mixing valve receiving and mixing the cooling fluid from the hot line and the cold line and providing the mixed cooling fluid to the heat source. The cooling system further includes a heat exchanger provided in the cold line and operating to cool the cooling fluid flowing through the cold line, and a bladder tank having a bladder and including a hot side on one side of the bladder in fluid communication with the hot line and a cold side on an opposite side of the bladder in fluid communication with the cold line. The cooling system is configured so that when the heat source is on and generating heat, cold cooling fluid from the cold side of the bladder tank is provided to the mixing valve and when the heat source is off and not generating heat, cold cooling fluid from the cold line fills the cold side of the bladder tank.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a thermal cooling system for a laser system including a bladder tank is merely exemplary in nature, and is in no way intended to limit the invention or its applications or uses. As mentioned, the thermal cooling system has particular application for cooling a laser system. However, as will be appreciated by those skilled in the art, the cooling system discussed herein will have application for other large transient heat loads that require a precise cooling fluid temperature.

Figure 1:
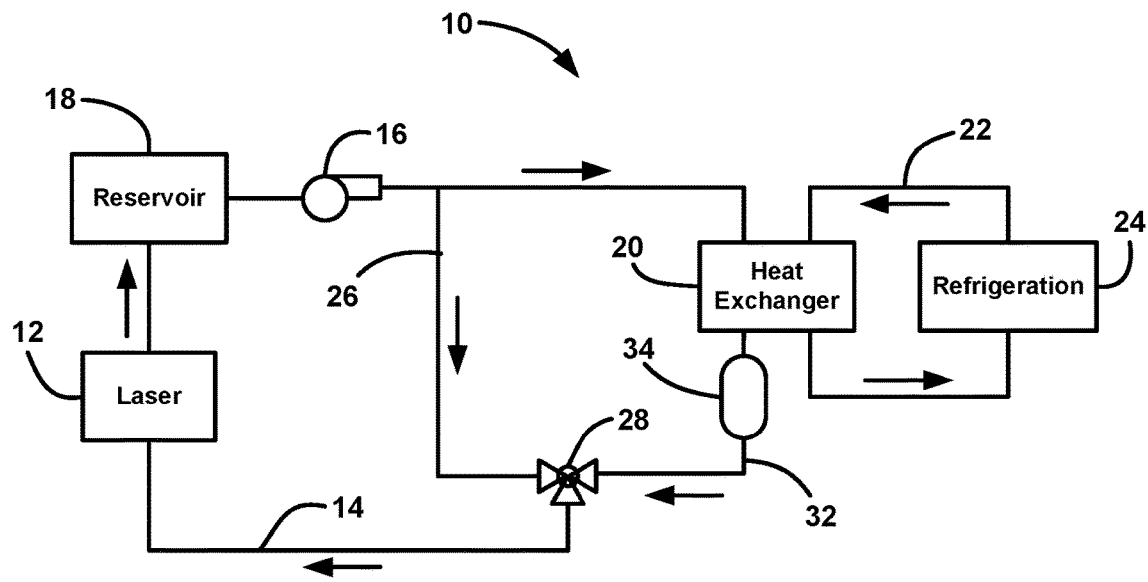
FIG. 1 is a schematic block diagram of a known thermal cooling system for a laser system.

FIG. 1 is a schematic block diagram of a known thermal cooling system 10 for cooling a laser system 12, such as a solid state laser or a fiber laser amplifier system of the type referred to above. The system 10 includes a coolant loop 14 having a number of cooling fluid lines that direct a cooling fluid in the direction indicated by the arrows, where the cooling fluid is pumped through the loop 14 by a pump 16 from a small reservoir 18 that allows for fluid expansion or contraction while setting loop pressure. The heated cooling fluid from the laser system 12 is directed to a heat exchanger 20 where heat is removed from the cooling fluid by a refrigeration loop 22 that circulates a refrigerant provided by a refrigeration system 24 having the necessary refrigeration components, such as compressors, condensers, etc. to provide the refrigerant in the loop 22. It is noted that the refrigeration system 24 and the cooling loop 22 can be any suitable refrigeration system that would be application dependent, such as whether the system 10 is on an aircraft, ship, etc., where the refrigeration system 24 may receive ram air to provide the ultimate heat dump. For aircraft applications, the refrigeration loop 22 may be of the air-cycle type.

Because it is generally not possible to precisely control the temperature of the cooling fluid provided to the laser system 12 by the heat exchanger 20 alone, it is typically necessary to employ a thermal mixing valve 28 that mixes the heated cooling fluid from a hot by-pass flow line 26 in the loop 14 and the cooled cooling fluid from the heat exchanger 20 from a cold flow line 32 to accurately control the temperature of the cooling fluid being provided to the laser system 12. It is noted that the terms hot and cold are meant to be used herein as relative terms where the actual temperature of the cooling fluid may not be the normal sense of hot or cold. The valve 28 can be any mixing valve suitable for the purposes described herein, such as a valve that incorporates a bimetallic strip or a valve that includes a temperature sensor internal to the valve 28 that measures the temperature of the cooling fluid being provided to the laser system 12. In order to reduce the size of the heat exchanger 20 and the refrigeration system 24 and still be able to effectively provide the desired cooling when the laser system 12 is on, the system 10 includes a thermal storage tank 34 in the cold line 32 that stores cold cooling fluid from the heat exchanger 20 when the laser system 12 is off that is available to cool the laser system 12 when it is operating. However, as discussed above, use of this type of thermal storage tank has a number of drawbacks that reduce its ability to accurately and precisely control the temperature of the laser system 12.

Figure 2:
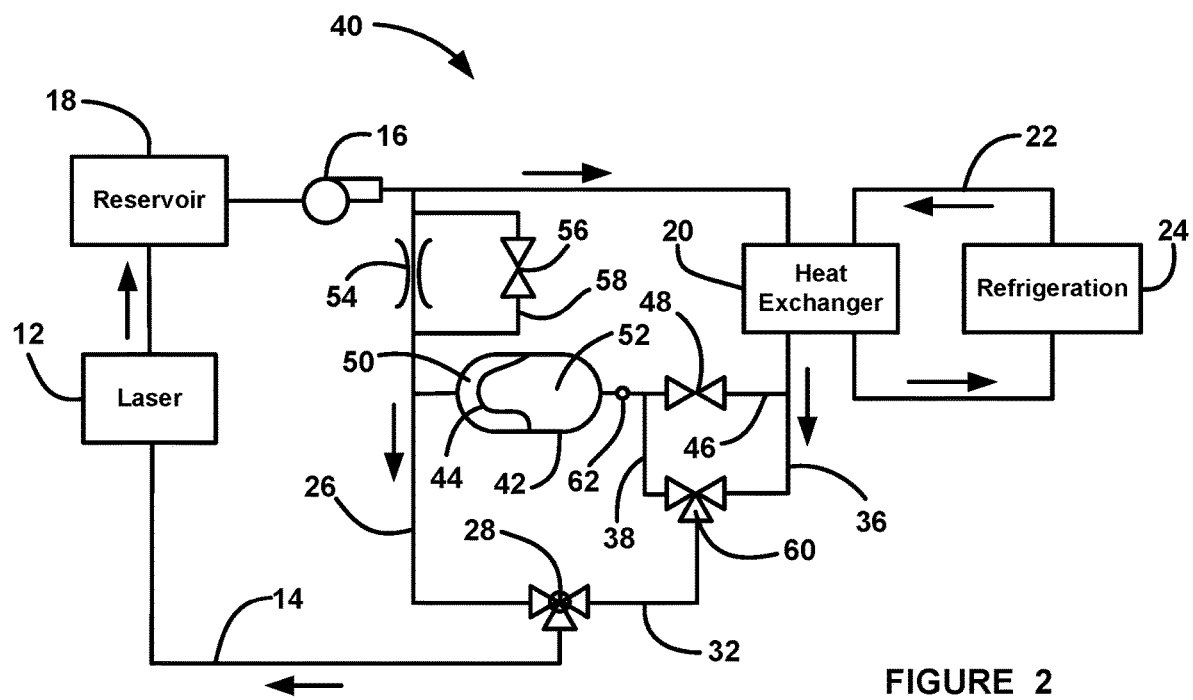
FIG. 2 is a schematic block diagram of a thermal cooling system for a laser system that includes a bladder tank.

FIG. 2 is a schematic block diagram of a thermal cooling system 40 that is similar to the thermal cooling system 10, where like elements are identified by the same reference number. As will be discussed in detail below, the system 40 includes a bladder storage tank 42 having a bladder 44 that operates to store low temperature cooling fluid during times when the laser system 12 is off, and provide that cooling fluid to the laser system 12 during times when it is on. A cold side 52 of the bladder tank 42 is connected to a tank recharge line 46 having a recharge valve 48 that is in fluid communication with a cold line 36 so that cooling fluid from the cold line 36 can enter and exit the tank 42 on one side of the bladder 44. A hot side 50 of the bladder tank 42 is connected to the hot line 26 so that hot cooling fluid can enter and exit the tank 42 on the other side of the bladder 44. Therefore, the volume of the cooling fluid within the bladder tank 42 is always constant, where the cooling fluid is able to flow into and out of each side of the tank 42 depending on its operational condition discussed herein. Thus, the tank 42 is independent of gravity or accelerations, and hence has application for use on aircraft and ships.

When the laser system 12 is off, the thermal control mixing valve 28 provides automatic temperature control so that most of the cooling fluid flows through the hot line 26 because it is not heated by the laser system 12. When the laser system 12 is on, the mixing valve 28 provides automatic temperature control so that enough of the cooling fluid will flow from the cold side 52 of the bladder tank 42 through the lines 32 and 38 to achieve the desired cooling fluid temperature entering the laser system 12 when mixed with the cooling fluid flow from the hot line 26. While the laser system 12 is off, the minimal cooling fluid flow through the heat exchanger 20 will be significantly reduced in temperature because the heat exchanger 20 operates more efficiently with a lower flow rate. During this time, the cold cooling fluid is used to fill the cold side 52 of the bladder tank 42 by opening the recharge valve 48, where the valve 48 is closed when the laser system 12 is on. When the laser system 12 is off and most of the cooling fluid is flowing through the hot line 26, an orifice 54 in the hot line 26 creates a pressure drop so that the pressure is lower downstream of the orifice 54, which acts to draw the bladder 44 towards the hot side 50 and helps to draw the cooling fluid into the cold side 52 of the bladder tank 42. A by-pass valve 56 in a by-pass line 58 around the orifice 54 can be opened to by-pass the orifice 50 when the laser system 12 is on.

The system 40 also includes a three-way valve 60 that receives the cooling fluid flow from either line 38 from the cold side 52 of the tank 42 or the cold line 36 from the heat exchanger 20, where only one of the cooling fluid flows from the tank 42 or the line 36 is sent to the mixing valve 28 on the cold line 32. The valve 60 is controlled so that cooling fluid flow from the cold line 36 is sent to the mixing valve 28 when the laser system 12 is off. During the laser system off time the recharge valve 48 can be opened so that the cold side 52 of the bladder tank 42 is filled with the cold cooling fluid from the heat exchanger 20. When the laser system 12 is on the valve 48 is closed, and the valve 60 is controlled so that flow from the bladder tank 42 is sent to the mixing valve 28. If the laser system 12 is off for an extended period of time where the cooling fluid stored in the cold side 52 of the tank 42 has warmed up, the valve 60 can be opened to the line 38 to drain the cold side 52 and then refill it with cold cooling fluid from the heat exchanger 20. When the laser system 12 is off, the recharge valve 48 can be controlled to open and fill the cold side 52 of the bladder tank 42 when the cooling fluid exiting the heat exchanger 20 is cold enough. A drain/fill port 62 can be provided in the line 46 between the tank 42 and the valve 48 that allows for pumping out the tank 42 or vacuum/pressure transfer of fluid into or out of the tank 42.

The following example can be used to better understand the flow rate fractions of the cooling fluid received by the mixing valve 28. First define f as the flow rate fraction from the cold side 52 of the bladder tank 42 through the lines 32 and 38 having temperature $T_1$ and 1−f as the flow rate fraction from the hot line 26 having temperature $T_2$. The flows are sent to the mixing valve 28 with exit set temperature $T_s$, and thus the flow rate fraction is $f=(T_s-T_2)/(T_1-T_2)$. Based on this, the laser system 12 may, for example, require an inlet temperature of 22° C., and may heat the cooling fluid to 26° C., where the by-pass temperature of the cooling fluid in the hot line 26 is 26° C. and the cooling fluid flow exiting the cold side 52 of the bladder tank 42 could be 0° C. The set temperature for the mixing valve 28 is 22° C., and the flow rate fraction from the cold side 52 of the bladder tank 42 is (22−26)/(0−26)=0.154. This small flow rate fraction allows the bladder tank 42 to be small.

The colder the cooling fluid used to recharge or fill the cold side 52 of the bladder tank 42, the smaller the bladder tank 42 needs to be. However, the system 40 is flexible to any recharge temperature below that needed at the input of the laser system 12. The system 40 automatically adapts to different bladder tank recharge temperatures. Also, the system 40 tolerates sudden changes between recharging the bladder tank 42, holding the cold cooling fluid in the cold side 52 and lasing of the laser system 12, where the bladder tank 42 can be partially used or partially recharged when it is suddenly switched to cool the laser system 12.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A thermal cooling system for cooling a heat source, said cooling system comprising:
    a coolant loop providing a flow of cooling fluid to the heat source, said coolant loop including a cold flow line portion and a hot by-pass flow line portion;
    a mixing valve receiving and mixing the cooling fluid from the hot by-pass flow line portion and the cold flow line portion and providing the mixed cooling fluid to the heat source;
    a heat exchanger provided in the cold flow line portion and operating to cool the cooling fluid flowing through the cold flow line portion, said hot by-pass flow line portion by-passing the heat exchanger;
    a bladder tank having a bladder and including a hot side on one side of the bladder in fluid communication with the hot by-pass flow line portion and a cold side on an opposite side of the bladder in fluid communication with the cold flow line portion, wherein the cooling system is configured so that when the heat source is on and generating heat, cold cooling fluid from the cold side of the bladder tank is provided to the mixing valve and when the heat source is off and not generating heat, cold cooling fluid from the cold flow line portion fills the cold side of the bladder tank; and
    a three-way valve provided in the coolant loop that receives the cooling fluid from the bladder tank and the heat exchanger, and provides the cooling fluid from the bladder tank to the mixing valve and from the heat exchanger to the mixing valve.

2. The cooling system according to claim 1 further comprising a recharge valve provided in a recharge line between the bladder tank and the cold flow line portion and being opened when the heat source is off so as to allow the cooling fluid from the heat exchanger to flow into the cold side of the bladder tank.

3. The cooling system according to claim 1 further comprising a refrigeration system for providing a refrigerant to the heat exchanger to cool the cooling fluid.

4. The cooling system according to claim 1 wherein the first mixing valve includes a bimetallic strip.

5. The cooling system according to claim 1 further comprising a fixed orifice in the hot by-pass flow line portion that creates a low pressure downstream of the fixed orifice so that when the heat source is off, the lower pressure helps move the bladder towards the hot side of the bladder tank to cause the cold side of the bladder tank to be filled with the cold cooling fluid.

6. The cooling system according to claim 5 further comprising an orifice by-pass line that by-passes the fixed orifice and that includes a by-pass valve that is open when the heat source is on to remove the low pressure.

7. The cooling system according to claim 1 wherein the heat source is a laser system.

8. The cooling system according to claim 7 wherein the laser system includes diode lasers that pump either a fiber amplifier or solid state laser.

9. A thermal cooling system for cooling a laser system, said cooling system comprising:
   a coolant loop providing a flow of cooling fluid to the laser system, said coolant loop including a cold flow line portion and a hot flow line portion;
   a mixing valve receiving and mixing the cooling fluid from the hot flow line portion and the cold flow line portion and providing the mixed cooling fluid to the laser system;
   a heat exchanger provided in the cold flow line portion and operating to cool the cooling fluid flowing through the cold flow line portion, said hot flow line portion by-passing the heat exchanger;
   a bladder tank having a bladder and including a hot side on one side of the bladder in fluid communication with the hot flow line portion and a cold side on an opposite side of the bladder in fluid communication with the cold flow line portion, wherein the cooling system is configured so that when the laser system is on and generating heat, cold cooling fluid from the cold side of the bladder tank is provided to the mixing valve and when the laser system is off and not generating heat, cold cooling fluid from the cold flow line portion fills the cold side of the bladder tank;
   an orifice in the hot flow line portion that creates a low pressure downstream of the orifice so that when the laser system is off, the lower pressure helps move the bladder towards the hot side of the bladder tank to cause the cold side of the bladder tank to be filled with the cold cooling fluid; and
   a three-way valve provided in the coolant loop that receives the cooling fluid from the bladder tank and the heat exchanger, and provides the cooling fluid from the bladder tank to the mixing valve and from the heat exchanger to the mixing valve.

10. The cooling system according to claim 9 further comprising a fixed orifice by-pass line that by-passes the orifice and that includes a by-pass valve that is open when the laser system is on to remove the low pressure.

11. The cooling system according to claim 9 further comprising a recharge valve provided in a recharge line between the bladder tank and the cold flow line portion and being opened when the heat source is off so as to allow the cooling fluid from the heat exchanger to flow into the cold side of the bladder tank.

12. The cooling system according to claim 9 further comprising a refrigeration system for providing a refrigerant to the heat exchanger to cool the cooling fluid.

13. The cooling system according to claim 9 wherein the laser system includes diode lasers that pump either a fiber amplifier or solid state laser.

14. A thermal cooling system for cooling a laser system, said cooling system comprising:
   a coolant loop providing a flow of cooling fluid to the laser system, said coolant loop including a cold flow line portion and a hot flow line portion;
   a mixing valve receiving and mixing the cooling fluid from the hot flow line portion and the cold flow line portion and providing the mixed cooling fluid to the laser system;
   a heat exchanger provided in the cold flow line portion and operating to cool the cooling fluid flowing through the cold flow line portion, said hot flow line portion by-passing the heat exchanger;
   a bladder tank having a bladder and including a hot side on one side of the bladder in fluid communication with the hot flow line portion and a cold side on an opposite side of the bladder in fluid communication with the cold flow line portion, wherein the cooling system is configured so that when the laser system is on and generating heat, cold cooling fluid from the cold side of the bladder tank is provided to the mixing valve and when the laser system is off and not generating heat, cold cooling fluid from the cold flow line portion fills the cold side of the bladder tank;
   a recharge valve provided in a recharge line between the bladder tank and the cold flow line portion and being opened when the heat source is off so as to allow the cooling fluid from the heat exchanger to flow into the cold side of the bladder tank; and
   a three-way valve provided in the coolant loop that receives the cooling fluid from the bladder tank and the heat exchanger, and provides the cooling fluid from the bladder tank to the mixing valve and from the heat exchanger to the mixing valve.

15. The cooling system according to claim 14 further comprising a refrigeration system for providing a refrigerant to the heat exchanger to cool the cooling fluid.

16. The cooling system according to claim 14 wherein the laser system includes diode lasers that pump either a fiber amplifier or solid state laser.

\* \* \* \* \*